Patented May 9, 1950

2,506,786

UNITED STATES PATENT OFFICE 2,506,786

AMINOPURINE LACTATES

George H. Hitchings, Tuckahoe, N. Y., assignor to Burroughs Wellcome & Co. (U. S. A.) Inc., Tuckahoe, N. Y., a corporation of New York No Drawing. Application March 3, 1949, Serial No. 79,509

8 Claims. (Cl. 260—253)

This invention relates to certain purine derivatives for therapeutic use and its main object is to improve the solubility characteristics of such agents in aqueous media for parenteral administration. A number of the more important purine compounds, for example 2,6-diaminopurine, have shown promise in the treatment of leukemia and similar conditions. Other aminopurines such as adenine, 2-amino-purine and 2,6-8-triaminopurine are known to be physiologically active in the treatment of certain conditions.

A considerable difficulty attending the parenteral administration of these and related aminopurines has been their relative insolubility in aqueous solutions necessitating the injection of excessively large quantities of the solution to obtain therapeutic levels. Since the effective treatment of the condition requires administration of large quantities of the agents, their parenteral use may cause inconvenience and discomfort to the patient.

The compounds of enhanced solubility characteristics contemplated by the invention are lactic acid salts of purines having the formula

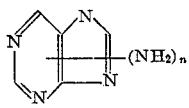

wherein $n$ is an integer having a value of from one to three. The introduction of the lactate radical into the purine base derived by the above formula effects a surprising increase in the solubility of the compound from that displayed by the usual purine derivatives. The increased solubility of the aminopurine facilitates the administration of substantially larger amounts of the agent in a given amount of aqueous solution than is possible with the more common salt derivatives of these compounds.

The new compositions are especially suitable as water soluble pharmaceutical preparations for the reason that the acid moiety, as distinguished from the acid radicals of many salts, is physiologically innocuous, can be readily assimilated and is a constituent of the system. The purine lactates are quite soluble in water, the solubility ranging as high as from 2.4 percent for diaminopurine lactate to 13.2 percent for triaminopurine lactate at room temperature, for example. The solubility of the agents in aqueous organic solvents is correspondingly increased in a similar manner.

A particularly desirable characteristic of the new compounds is that they display high temperature coefficients of solubility with the result that a pronounced increase in solubility is obtained when the solutions are warmed to body temperature or slightly above. This establishes a maximum solubility of the drug under the conditions of administration.

The lactate salts of selected aminopurines are readily prepared by dissolving the aminopurine and lactic acid in aqueous solution by the addition of heat. The following examples illustrate the preparation of parenteral solutions containing aminopurine lactates without intending to limit the invention.

Example 1

A parenteral solution of 2,6-diaminopurine lactate was prepared by dissolving 112 g. of diamino purine hydrate with 745 milliliters of 0.893 molar lactic acid in 1255 milliliters of distilled water by warming the solution to a temperature of about 60° C. The solution was clarified and then transferred to ampules and sterilized by heating in an autoclave for a period of 30 minutes at 15 pounds pressure. Upon cooling to room temperature a small amount of diaminopurine lactate precipitates but the residue is readily redissolved on warming the solution to about 45° C. and remains in solution when the temperature is reduced to about 40° C. for parenteral administration. When analyzed the solution was found to contain 50 milligrams of 2,6-diaminopurine per milliliter.

Example 2

A parenteral solution of adenine lactate was prepared in accordance with the procedure of Example 1.

Example 3

A parenteral solution of 2,6,8-triaminopurine lactate was prepared in accordance with the procedure of Example 1.

In comparison with the usual acid salts of aminopurines, the lactate derivatives display a remarkable solubility advantage over the known compounds and the differential increases in the vicinity of physiological temperatures. The invention likewise applies to the tautomeric forms of the aminopurines. The solubilities of various salts of aminopurines were compared with the solubilities of the corresponding lactates by dissolving one millimole of the purine and an equimolecular quantity of the acid in from 1 to 10 milliliters of water with the addition of heat. The samples were allowed to stand overnight at 28° C. and 0.5 milliliter of the supernatant fluid was withdrawn and the amount of the purine base determined spectrographically. The solubility calculations of these specimens are set forth in the following tabulation:

| Aminopurine salt | Solubility in milligram of purine per milliliter |
|---|---|
| 2,6-Diaminopurine | 1.43 |
| 2,6-Diaminopurine hydrochloride | 6.7 |
| 2,6-Diaminopurine basic chloride | 1.65 |
| 2,6-Diaminopurine nitrate | 1.03 |
| 2,6-Diaminopurine sulfate | 0.22 |
| 2,6-Diaminopurine phosphate | 1.48 |
| 2,6-Diaminopurine succinate | 0.11 |
| 2,6-Diaminopurine tartrate | 0.67 |
| 2,6-Diaminopurine malate | 0.60 |
| 2,6-Diaminopurine citrate | 1.5 |
| 2,6-Diaminopurine glutamate | 4.6 |
| 2,6-Diaminopurine ascorbate | 4.28 |
| 2,6-Diaminopurine hydrochloride at 37° | 10.0 |
| 2,6-Diaminopurine lactate | 23.8 |
| 2,6-Diaminopurine lactate at 40° | 50 |
| Adenine (6-aminopurine) | [1] 1.0 |
| Adenine hydrochloride | [1] 17.8 |
| Adenine sulfate | [1] 4.8 |
| Adenine nitrate | [1] 6.1 |
| Adenine lactate | 83.5 |
| 2,6,8-Triaminopurine | 5.1 |
| 2,6,8-Triaminopurine lactate | 132 |
| 2-Aminopurine lactate | 109 |

[1] Calculated from Feulgen, R. Die Chemie der Nukleinstoffe Berlin 1923 p. 105.

It will be appreciated the volume of parenterally administrable liquids may be reduced in relation to the increased solubility ratio of the lactate salt. This enables the administration of more concentrated doses of the aminopurine with resulting alleviation of the inconveniences and discomfort which attend the injection of large quantities of liquid.

I claim:

1. A parenterally administrable preparation comprising in aqueous solution a lactic acid salt of an aminopurine having the formula

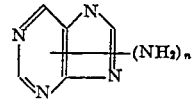

in which $n$ is an integer from one to three.

2. The process of solubilizing aminopurines which comprises dissolving the aminopurine having the formula

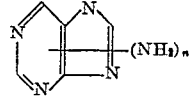

in which $n$ is an integer from one to three, in an aqueous solution in the presence of lactic acid and heating the solution.

3. A new compound comprising the lactic acid salt of a compound having the formula

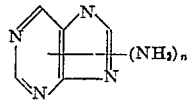

in which $n$ is an integer from one to three.

4. As a new compound 2,6-diaminopurine lactate.

5. As a new compound adenine lactate.

6. As a new compound 2,6,8-triaminopurine lactate.

7. A parenterally administrable aqueous solution containing 2,6-diaminopurine lactate wherein at least 2 percent of the 2,6-diaminopurine is contained in the solution.

8. A parenterally administrable aqueous solution containing adenine lactate wherein at least 3 percent of adenine is contained in the solution.

GEORGE H. HITCHINGS.

No references cited.